(12) United States Patent
Lee

(10) Patent No.: US 6,322,033 B1
(45) Date of Patent: Nov. 27, 2001

(54) COMBINATION COMPUTER MOUSE PAD AND WRITING PAD

(75) Inventor: Leonard Lee, Orem, UT (US)

(73) Assignee: Giraffics, Inc., Lindon, UT (US)

( * ) Notice: Subject to any disclaimer, the term of this patent is extended or adjusted under 35 U.S.C. 154(b) by 0 days.

(21) Appl. No.: 09/480,972

(22) Filed: Jan. 11, 2000

(51) Int. Cl.$^7$ .............. B65D 19/00; B42D 1/00
(52) U.S. Cl. ............ 248/346.01; 248/918; 281/2; 428/85
(58) Field of Search ............... 248/346.01, 118, 248/918; 281/2, 51; 428/85, 77

(56) References Cited

U.S. PATENT DOCUMENTS

| | | | |
|---|---|---|---|
| 2,132,121 | * 10/1938 | Nudelman | 30/454 |
| 4,278,483 | * 7/1981 | Mansolillo | 156/79 |
| 4,799,054 | * 1/1989 | House | 345/163 |
| 4,834,502 | * 5/1989 | Bristol et al. | 359/893 |
| 4,884,826 | * 12/1989 | Slagsvol | 281/2 |
| 4,907,824 | * 3/1990 | Smirnoff | 281/45 |
| 5,197,699 | * 3/1993 | Smith et al. | 248/118 |
| 5,217,781 | * 6/1993 | Kuipers | 428/85 |
| 5,340,075 | * 8/1994 | Schriner | 248/346.01 |
| 5,358,766 | * 10/1994 | Field | 428/77 |
| 5,405,168 | * 4/1995 | Holt | 281/2 |
| 5,508,084 | * 4/1996 | Reeves et al. | 428/172 |
| 5,876,010 | * 3/1999 | Murphy | 248/346.01 |
| 5,942,311 | * 8/1999 | Scianna | 428/195 |

FOREIGN PATENT DOCUMENTS

| | | |
|---|---|---|
| 19707381 | * 8/1998 | (DE) . |
| 11282621 | * 10/1999 | (JP) . |
| 2000148387 | * 5/2000 | (JP) . |

* cited by examiner

*Primary Examiner*—Anita King
(74) *Attorney, Agent, or Firm*—TraskBritt

(57) ABSTRACT

A combination mouse pad and writing pad comprised of a plurality of sheets of paper secured together and further secured to a base, with each of the sheets of paper having a textured surface with a large number of "micro-bumps" screen printed thereon and spaced apart between 0.005 " and 0.100". The sheets of paper are secured together along at least one side edge and to the base which has a non-skid backing. Furthermore, each of the plurality of sheets of paper include a scent element provided in the textured surface which is formed in a screen printing process, providing a pleasant aroma to its approximate surroundings.

5 Claims, 2 Drawing Sheets

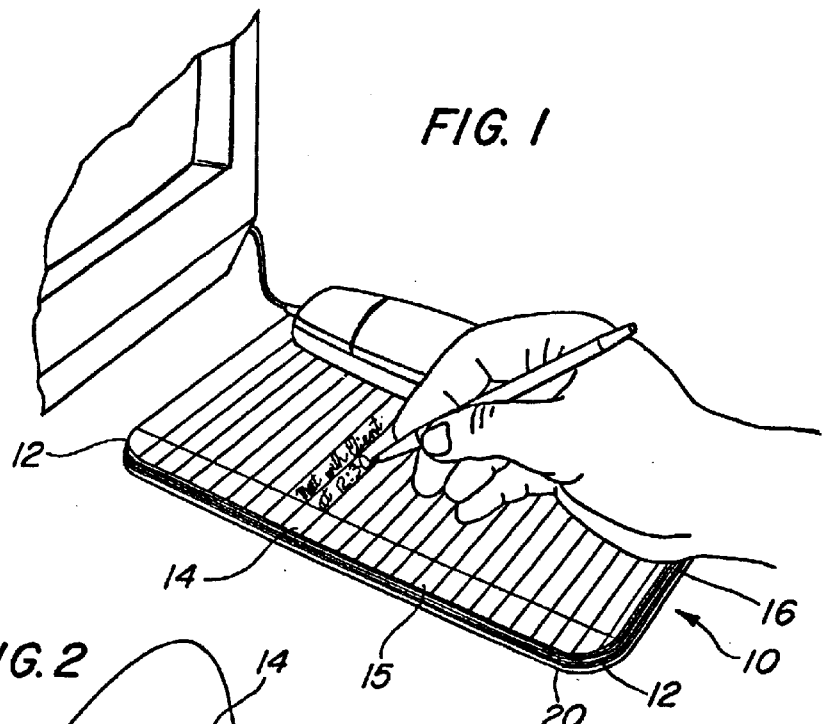
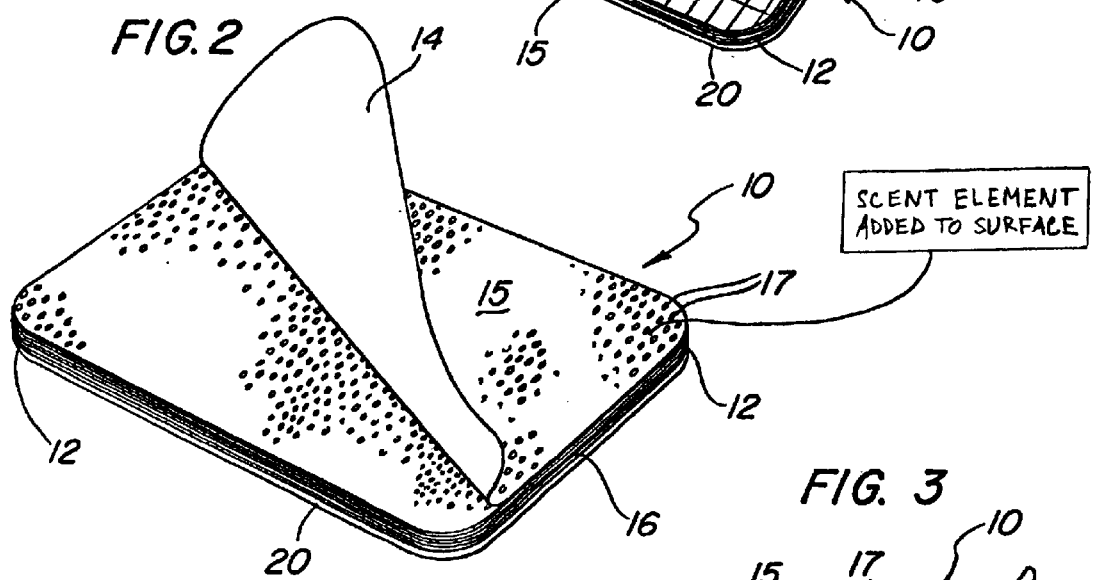
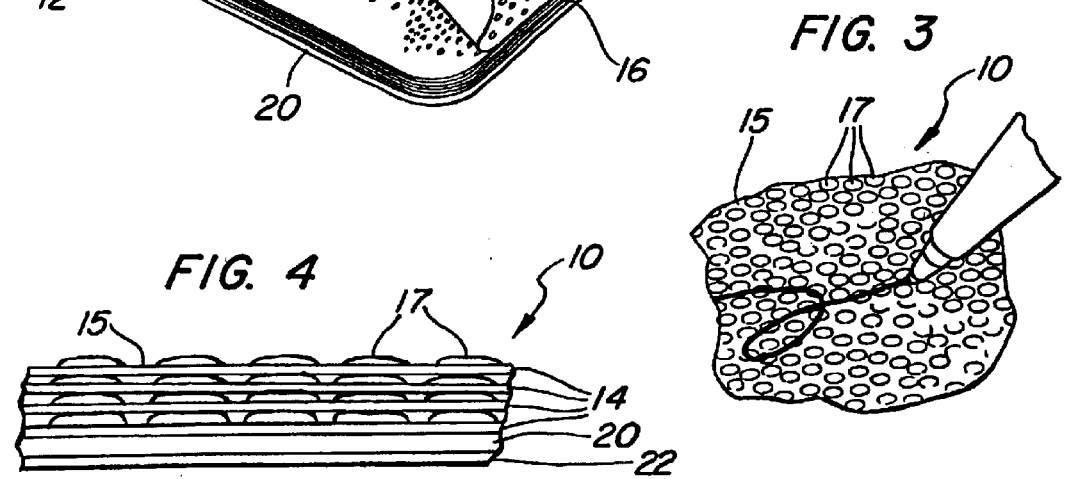
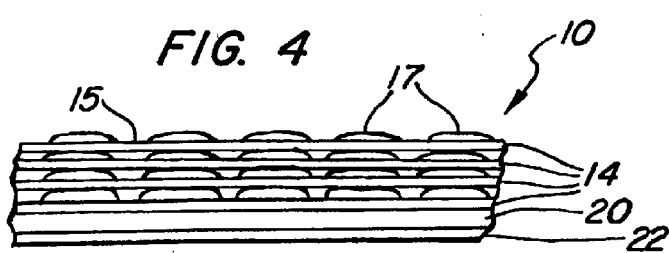

COMBINATION COMPUTER MOUSE PAD AND WRITING PAD

BACKGROUND OF THE INVENTION

1. Field of the Invention

This invention relates generally to writing pads, and more particularly, to a writing pad that may also be used as a computer mouse pad.

2. State of the Art

Computer mouse pads have become a necessity to individuals who use a computer with a mouse. A computer mouse has a track ball at its bottom which touches contacts within the interior of the mouse. As the track ball is moved, specific contacts are triggered, and, subsequently, the movement of the pointer on the screen is controlled. To use a mouse effectively, the linear movement of the mouse across a surface is accurately translated to the rotational movement of the track ball. This can be frustrated if the surface is not sufficient to maintain the friction necessary to contact the track ball at all times. Accordingly, the mouse pad is used to maintain the friction necessary to control the track ball such that the track ball does not slip.

A problem with mouse pads is that they take up precious space on a desk already crowded with a computer and other computer accessories. Often, a user, who is taking notes, must place the note pad in his lap or in some other inconvenient position to take notes.

This very problem has been addressed by U.S. Pat. No. 5,876,010 to Murphy, disclosing a combination mouse pad and writing pad, the contents of which are incorporated by this reference. In particular, there is disclosed a mouse pad that includes a base with a non-slip bottom layer which is attached to a plurality of sheets of paper. Each of the sheets of paper include a textured surface that is thermographically printed thereon.

In thermography, obtaining the textured surface is accomplished through a multistep process. Essentially, a thermographic process includes the following steps: (1) a lithographic ink is printed in the conventional manner onto a paper substrate; (2) a powder resin is applied over the entire surface of the printed sheet while the ink is still wet; (3) the excess resin is vacuumed from the sheet leaving the image with a slight dusting of resin and the non-image area free of resin; and (4) passing the printed sheet through a heat chamber at a temperature sufficient to cause the resin to "puff" into a raised or textured surface. By utilizing the thermographic process to apply a textured surface to each sheet of paper, the textured surface allows the user to write on the textured paper and also effectively maneuver the mouse thereon.

However, in the above thermographic process, several disadvantages exist. To name a few, the thermographic process must be accomplished in a transfer batch of one. Further, the theremographic multi-step process must be applied immediately and sequentially since the lithographic ink dries in a matter of seconds. In addition, because of the degree of heat applied in the process, the process dictates that the paper substrate be thick enough not to curl or deform due to the changing humidity in the paper in the curing process. As a result, a high degree for potential error in the textured surface exists.

Therefore, there remains a need for an improvement in the manufacturing process of forming the textured surface on the sheets of paper that will maintain the ease for a user to write and effectively maneuver the mouse thereon.

BRIEF SUMMARY OF THE INVENTION

To overcome the deficiencies of the prior art, the present invention provides an improved mouse pad with multiple features, including an improved mouse pad which may also be used as a writing pad. Further, the present invention provides an additive, such as a scent element, to the improved mouse pad and a method of manufacturing the present invention to include the additive.

In accordance with one aspect of the present invention, there is provided a mouse pad comprised of a plurality of sheets of paper which are secured together and further secured to a base. Each of the sheets of paper are formed having a surface layer that is screen printed thereon, so as to provide a textured surface which provides an ideal surface to operate a mouse, and, which sheets of paper are secured together along at least one side edge thereof and to a base having a non-skid lower surface. Additionally, the screen printed surface layer includes an additive such as a scent element.

Other features and advantages of the present invention will become apparent to those of skill in the art through a consideration of the ensuing description, the accompanying drawings, and the appended claims.

BRIEF DESCRIPTION OF THE SEVERAL VIEWS OF THE DRAWINGS

The invention is further described with the use of the following illustrations, in which:

FIG. 1 is a partial perspective view of a preferred embodiment of a combination mouse pad and writing pad of the present invention supported on a working surface, adjacent a computer, showing a user writing on the top surface thereof, adjacent a computer mouse supported on the top surface;

FIG. 2 is a further perspective view of a mouse pad in accordance with the present invention, showing a top sheet partially lifted from the pad in preparation to tear it off the top of the pad;

FIG. 3 is an enlarged partial perspective view of one embodiment of a top surface of the sheets of the pad of the present invention, showing micro-bumps screen printed thereon;

FIG. 4 is an enlarged partial cross-sectional view of a further embodiment of the pad of the present invention, showing different shaped micro-bumps or designs screen printed on the top surface of each sheet of paper, and a non-skid layer on the bottom of the base.

DETAILED DESCRIPTION OF THE INVENTION

Figure 5:
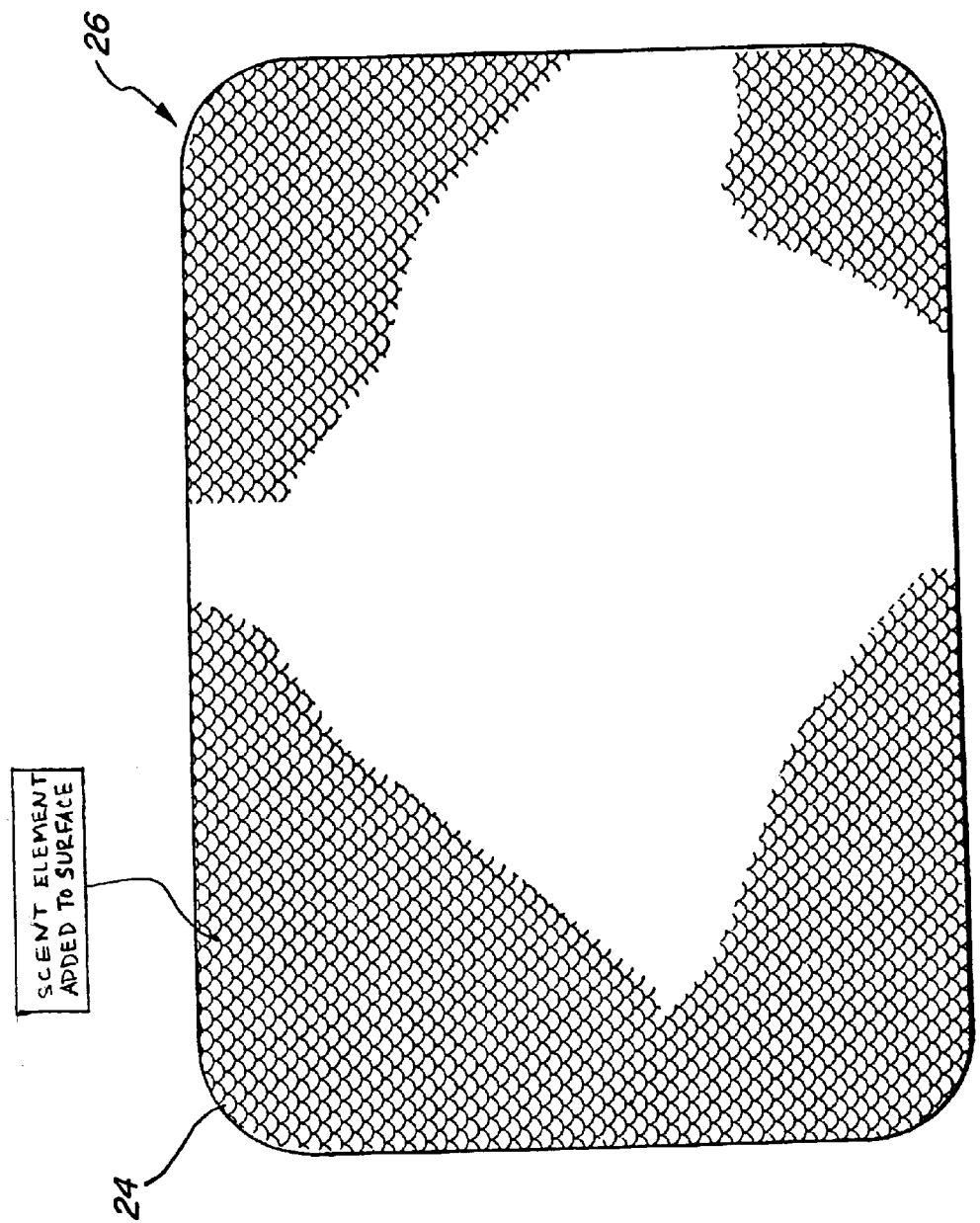
FIG. 5 is a top plan view of a further embodiment of the combination mouse pad and writing pad of the present invention, showing the presently preferred embodiment of scales screen printed on the top surface thereof.

The following description is provided to enable any person skilled in the art to make and use the invention and sets forth the best modes contemplated for carrying out this invention. Various modifications, however, will remain readily apparent to those skilled in the art, since the generic principles of the present invention have been defined herein specifically to provide a description of an improved combination mouse pad and writing pad indicated generally at 10.

The combination pad 10 can be of any desired size, thickness, or shape, but may include shapes such as circular, oval, square, rectangular, pentagon, etc. The preferred shape of the pad is substantially rectangular, with dimensions approximately 22 cm by 19 cm, but may be within ranges of 15–30 cm for the length and width, with rounded corners 12 and up to approximately 1 cm thick. It should be noted that the rectangular shaped pad or any of the described shapes for pads may be of any suitable dimension, and that the present invention is not limited to the previously described dimensions.

A plurality of separate sheets 14, fabricated from any type of paper, such as bond paper, and which has a top textured surface 15 that is screen printed thereon by a screen printing process well known to those skilled in the art and described in further detail hereinafter, are secured together along at least one side edge 16 and to a base 20. In addition, the screen printing process includes additives, i.e., scent element, lubricant, adhesive, etc., to the textured surface (see, FIGS. 2 and 5), which will also be described in more detail hereinafter. The sheets 14 may be secured together and to the base 20 via staples, sewing, adhesive, paste, tape or by any securing means known to those skilled in the art. The base 20 is preferably formed from a chip board and a non-slip surface 22, which is applied to the lower or bottom surface thereof. The non-slip surface 22 may consist of a gummy back, such as a label adhesive, or a latex applied to or printed on the bottom of the base 20, or a textured rubberized layer or strip may be secured to the lower surface.

As best shown in FIGS. 2–4, at least the majority of the top surface 15 of each separate sheet 14, where the tracking a computer mouse would take place, has thousands of "micro-bumps", designs, or the like 17, printed thereon. These micro-bumps may be formed or printed on the top surface 15 in any desired manner, preferably by a screen printing process using clear or colored ink. Any desired configuration or design, such as dots, grids, scales, squares, waves, x's, or the like may be used by forming a screen having the desired design formed therein. In the preferred embodiments of the invention, the design is printed so as to have a spacing or incidence of friction therebetween of from 0.005" to 0.100". Otherwise said, in the surface 15 as shown in FIGS. 3–4, the micro-bumps 17, whether formed as circles, ovals, or scales are screen printed so as to have a minimum height, and a spacing of from 0.005" to 0.100" therebetween.

Although all of the various shapes of the above-mentioned micro-bumps 17 form a random textured surface providing a sufficient coefficient of friction necessary to continuously contact the track ball of a computer mouse, it has been found that the preferred textured surface is a scaled surface 24. As shown in FIG. 5, the preferred embodiment illustrates the spacing of the scales of a mouse pad 26 being approximately 0.005", providing a surface which properly operates a tracking ball, and is the best surface on which to write.

In addition, it has also been found that as the track ball of a computer mouse moves across the surface 15 or 24, the surface will clean the track ball and mouse base. In other words, the textured surface 15 or 24 acts as a brush, picking up or removing accumulated debris or dirt that might be on the lower surface of the mouse housing, the track ball, or in the mouse housing area where the track ball rotates.

Furthermore, it has been found that including additives using the conventional thermographic process is limited.

Specifically, adding scented oil to a lithographic ink and or the thermographic resin would interfere with the chemistry of the thermographic process and would inhibit the resin to "puff" into the raised or textured surface needed. As a result, the thermographical process that includes an additive such as a scent element will likely produce an insufficient surface, and thus, be counter-productive, costly and inefficient.

In the present invention, including additives such as a scent element in the top surface of each of the sheets of paper of the mouse pad 26 would create a unique ambience or atmosphere for the computer user. For example, a computer system may include a mouse pad, screen saver, etc., which displays mountain scenery, and may also include a mouse pad 26 of the present invention with a fragrance of pine, thereby, adding to the ambience or atmosphere for a computer user. The various scented oils of the present invention may include pine, musk, rose, cinnamon, mint, coconut, peach, grape, apple, pineapple, various perfumes and/or colognes, and any other commercialize scented oil.

As previously set forth, the present invention is practiced by including additives such as a scent element by utilizing a screen printing process. Generally, the screen printing process is a method of printing primarily used for the deposition of thick layers of ink applied to a wide variety of substrates, where many types of ink may be utilized. The ink is applied to the substrate by a squeegee pressuring the ink through a fabric screen mesh, which has the effect of metering the ink in a uniform fashion, such that as the mesh of the screen is finer, there is less ink that is applied to the substrate. On the other hand, the coarser the mesh of the screen, the ink deposited on the substrate is increased accordingly. A stencil is also applied to the mesh to block out the non-image areas, of which the stencil thickness also has a bearing upon the amount and height of the ink deposited on the substrate. Further, it should be noted that the ink employed may be solvent based, drying by evaporation or an ultraviolet sensitive ink so that it may cure instantaneously by ultraviolet light.

In the screen printing process of the present invention, the scented oils may be added without interfering with the chemistry of the cure (see, FIGS. 2 and 5). For example, when scented oil is applied in the ultraviolet sensitive ink, a partial cure of the ink is attained. Accordingly, the cure is sufficient to maintain the height of the surface texture on the sheets of paper, but uncured enough to allow a fragrance or aroma of the scented oil to escape. Therefore, the screen printing process allows application of the scented oils to the paper in a more controlled fashion, thereby allowing control of the strength of the fragrance or aroma along with the ability to add to the ink itself. Furthermore, the screen printing process allows for the development of a better mousing surface for the rollerball found in the common computer mouse because of its ability to meter the textured ink more precisely. In addition, the curing of the ink in the screen printing process uses less heat than that of the thermographic printing process, thereby overcoming many of the disadvantages associated with thermography.

Those skilled in the art will appreciate that various adaptations and modifications of the above-described preferred embodiments can be configured without departing from the scope and spirit of the invention. Therefore, it is to be understood that, within the scope of the appended claims, the invention may be practiced other than as specifically described herein.

What is claimed is:

1. A process of manufacturing a combination computer mouse pad and writing pad, the method comprising the steps of: providing a plurality of sheets of paper and a base, each of said plurality of sheets of paper having
   at least one side edge, a top surface and a lower surface, and said base having at least one
   edge, an upper surface and a lower surface; forming micro-bumps on substantially the entire top surface of each of said plurality of sheets of
   paper by a screen printing process; and securing said plurality of sheets of paper and said base together so as to form said combination
computer mouse pad and writing pad.

2. The process according to claim 1, wherein said screen printing process comprises adding a scent element while forming said micro-bumps.

3. The process according to claim 1, wherein said micro-bumps are formed to provide a substantially uniform textured surface to said top surface.

4. The process according to claim 2, wherein said scent element comprises a scented oil.

5. The process according to claim 1, wherein said lower surface of said base further comprises a non-skid portion.

* * * * *